(12) United States Patent
Laase et al.

(10) Patent No.: US 9,547,831 B2
(45) Date of Patent: Jan. 17, 2017

(54) HIGH LEVEL RFID SOLUTION FOR RENTAL TOOLS AND EQUIPMENT

(76) Inventors: Joshua E. Laase, Houston, TX (US); Thomas G. Whiteley, Houston, TX (US); James W. McGrath, Houston, TX (US)

( * ) Notice: Subject to any disclaimer, the term of this patent is extended or adjusted under 35 U.S.C. 154(b) by 888 days.

(21) Appl. No.: 13/166,694

(22) Filed: Jun. 22, 2011

(65) Prior Publication Data
US 2011/0273296 A1   Nov. 10, 2011

Related U.S. Application Data

(63) Continuation-in-part of application No. 13/103,587, filed on May 9, 2011, now Pat. No. Re. 44,793, which is an application for the reissue of Pat. No. 7,917,409, application No. 13/166,694, which is a continuation-in-part of application No. 13/103,608, filed on May 9, 2011, now abandoned, which is an application for the reissue of Pat. No. 7,917,409, which is a continuation-in-part of application No. 10/277,531, filed on Oct. 22, 2002, now Pat. No. 7,603,296.

(51) Int. Cl.
*G08B 13/14* (2006.01)
*G06Q 10/00* (2012.01)

(52) U.S. Cl.
CPC .................... *G06Q 10/00* (2013.01)

(58) Field of Classification Search
CPC ........ G06F 17/00; G06F 17/60; G06F 17/602; G06Q 10/00; G06Q 10/08; G06Q 10/0833; E21B 19/18; E21B 19/20
USPC .. 340/10.1–10.5, 572.1–572.9; 235/375–385
See application file for complete search history.

(56) References Cited

U.S. PATENT DOCUMENTS

| | | | | |
|---|---|---|---|---|
| 4,698,631 A | * | 10/1987 | Kelly et al. | E21B 19/20 |
| 5,629,981 A | * | 5/1997 | Nerlikar | 713/168 |
| 6,501,382 B1 | * | 12/2002 | Rehfus et al. | F16C 41/008 |
| 6,705,522 B2 | * | 3/2004 | Gershman et al. | G06Q 10/00 |
| 6,972,682 B2 | * | 12/2005 | Lareau et al. | G06Q 10/08 |
| 7,014,100 B2 | * | 3/2006 | Zierolf | G06F 17/00 |
| 7,504,949 B1 | * | 3/2009 | Rouaix et al. | 340/572.1 |
| 7,603,296 B2 | * | 10/2009 | Whiteley et al. | G06F 17/60 |
| 7,917,409 B1 | * | 3/2011 | Whiteley et al. | G06Q 10/06 |
| 8,602,536 B1 | * | 12/2013 | Sarnoff et al. | 347/85 |
| 8,991,489 B2 | * | 3/2015 | Redlinger et al. | E21B 23/00 |
| 2003/0233165 A1 | * | 12/2003 | Hein et al. | 700/216 |
| 2005/0098403 A1 | * | 5/2005 | McIntyre | 190/110 |
| 2007/0268144 A1 | * | 11/2007 | Dobosz | 340/572.8 |
| 2008/0077802 A1 | * | 3/2008 | Richardson et al. | 713/189 |
| 2008/0111691 A1 | * | 5/2008 | Lee et al. | 340/572.1 |
| 2010/0157766 A1 | * | 6/2010 | Gregg et al. | 369/53.41 |
| 2011/0084807 A1 | * | 4/2011 | Logan et al. | 340/10.1 |
| 2012/0242453 A1 | * | 9/2012 | Delgado et al. | 340/10.1 |

\* cited by examiner

*Primary Examiner* — Sam Rimell
(74) *Attorney, Agent, or Firm* — Nolte & Associates, PC

(57) ABSTRACT

A system for monitoring use of a tool. The system may include an RFID tag coupled to the tool. A collar may be removably coupled to the tool and configured to be de-coupled from the tool prior to the tool being used. An RFID reader may be coupled to the collar and configured to transmit a first alert signal when the RFID reader is out of transmission range from the RFID tag.

5 Claims, 2 Drawing Sheets

HIGH LEVEL RFID SOLUTION FOR RENTAL TOOLS AND EQUIPMENT

CROSS-REFERENCE TO RELATED APPLICATIONS

This application is a continuation-in-part of U.S. patent application Ser. No. 13/103,587 and U.S. patent application Ser. No. 13/103,608, each filed on May 9, 2011, which are reissue applications of U.S. Pat. No. 7,917,409 B1, which issued on Mar. 29, 2011, which is a continuation-in-part of U.S. Pat. No. 7,603,296, filed on Oct. 22, 2002, the entire content of each being hereby incorporated by reference.

BACKGROUND

Oil and gas well tools and equipment are distributed to various locations around the world. The tools and equipment are often expensive to purchase, and as such, one cost-efficient option may be to rent the tools or equipment rather than buy them. The payment structure for rental/license agreements for oil and gas tools or equipment often times is based upon the amount of time the tools or equipment are actually used, which presents challenges for licensors in tracking the actual use of the tools or equipment to generate maximum license revenue.

There is a need, therefore, for systems and methods for monitoring the use of rental tools and equipment. In particular, there is a need for systems and methods for monitoring the use of rental tools and equipment in the oil and gas industry.

SUMMARY OF THE INVENTION

Embodiments of the disclosure may provide a system for monitoring use of a tool. The system may include an RFID tag coupled to the tool. A collar may be removably coupled to the tool and configured to be de-coupled from the tool prior to the tool being used. An RFID reader may be coupled to the collar and configured to transmit a first alert signal when the RFID reader is out of transmission range from the RFID tag.

Embodiments of the disclosure may further provide a tool monitoring assembly. The tool monitoring assembly may include an RFID tag coupled to a tool and configured to transmit an RF signal. A collar may be removably coupled to the tool. An RFID reader may be coupled to the collar. The RFID reader may be configured to receive the RF signal when the collar is removably coupled to the tool and to transmit a first alert signal when the RFID reader fails to receive the RF signal indicating that the collar has been de-coupled from the tool. A communication device may be coupled to the collar and configured to receive the first alert signal.

Embodiments of the disclosure may further provide a method for monitoring use of a tool. The method may include transmitting an RF signal from an RFID tag coupled to the tool. The method may also include receiving the RF signal with an RFID reader coupled to a collar, and the collar may be removably coupled to the tool. The method may further include transmitting a first alert signal from the RFID reader to a communication device coupled to the collar when the RFID reader fails to receive the RF signal. The first alert signal may indicate that the collar has been de-coupled from the tool.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
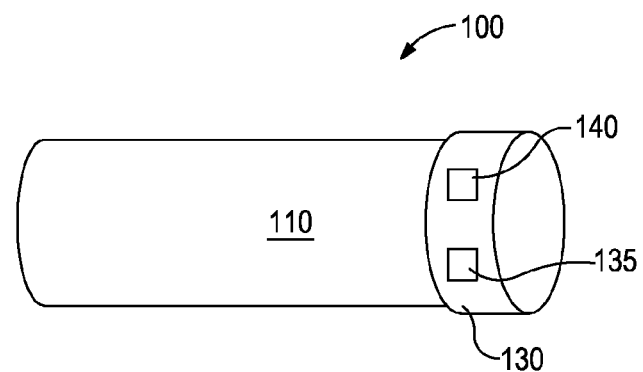
FIG. 1 illustrates an exemplary tool monitoring assembly including a tool or piece of equipment and a collar, according to one or more embodiments described.

It is to be understood that the following disclosure describes several exemplary embodiments for implementing different features, structures, or functions of the invention. Exemplary embodiments of components, arrangements, and configurations are described below to simplify the present disclosure, however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 2:
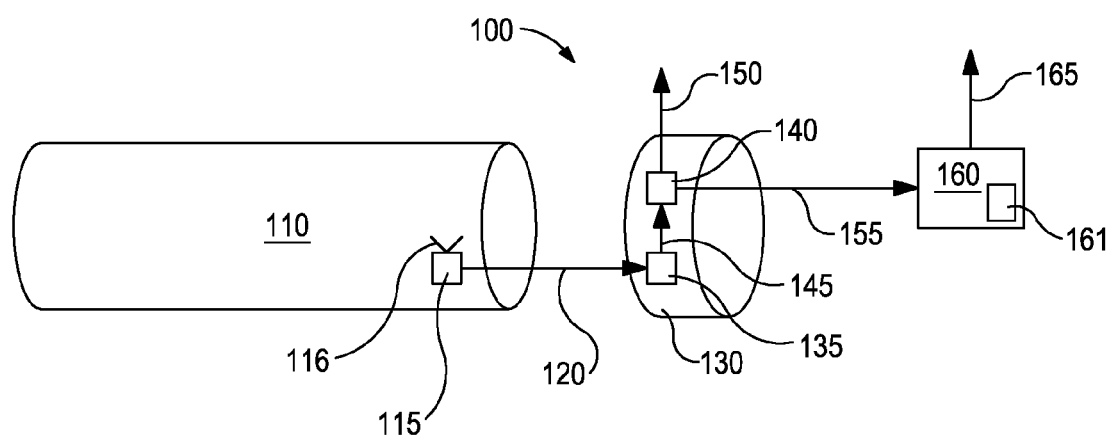
FIG. 2 illustrates the tool monitoring assembly, where the collar is de-coupled or otherwise removed from the tool or piece of equipment, according to one or more embodiments described.
Figure 3:
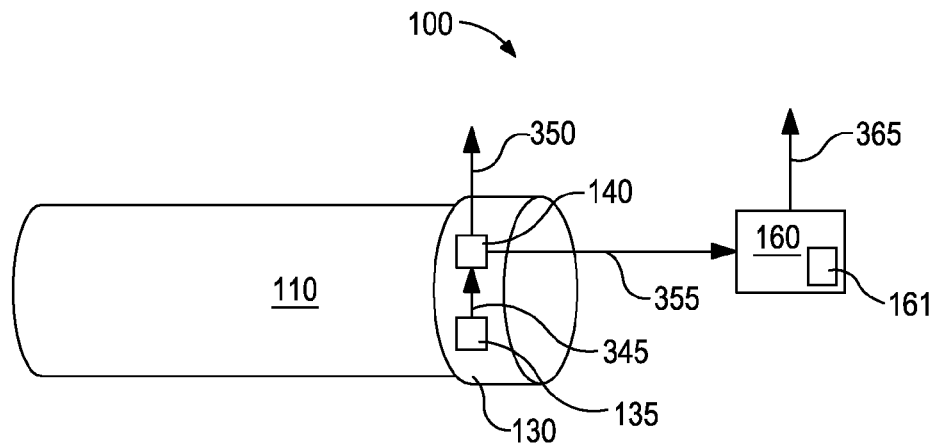
FIG. 3 illustrates the tool monitoring assembly, where the collar is re-coupled to the tool or piece of equipment, according to one or more embodiments described.

FIG. 1 illustrates an exemplary tool monitoring assembly 100 including a tool or piece of equipment 110 and a collar 130; FIG. 2 illustrates the tool monitoring assembly 100, where the collar 130 is de-coupled or otherwise removed from the tool or piece of equipment 110; and FIG. 3 illustrates the tool monitoring assembly 100, where the collar 130 is re-coupled to the tool or piece of equipment 110. The collar 130 may be de-coupled from the tool 110 prior to the tool 110 being placed "in use." In at least one embodiment, the collar 130 may be re-coupled to the tool 110 when the tool 110 is no longer in use.

The tool 110 may be a rental or licensed tool or other piece of equipment that is used in the oil and gas industry. For example, the tool 110 may be used during the drilling process, the completion process, the production process, or the like. In at least one embodiment, the tool 110 may include equipment such as drill bits, drill pipe, drilling motors, drilling jars, steering equipment and related tools, cementing float equipment, cementing head equipment, verification and inspection equipment, engineering equipment, processing equipment, drilling and production risers, control umbilicals, bit subs and sub assemblies, stabilizers, under-reamers, tubular products, handling tools, liner hangars and running tools, packers and running tools, downhole production equipment, well screens, wellheads, surface test manifolds, surface treating manifolds, Christmas trees, surface flow equipment, oil and gas perforating equipment and related tools, oil and gas well logging equipment and related tools, oil and gas well solid wire-line tools, fishing tools, containers for any of the above, associated rental items, or the like. It should be appreciated that, although the tool 110 is depicted as a cylinder or tubular, the invention is not limited to any particular shape or size of tool, as various other shapes and sizes are contemplated within the scope of the invention.

The collar 130 may be any device configured to be coupled to or removably coupled to the tool 110. As used herein, coupled shall mean fastened, secured, or attached, and removably coupled shall mean coupled and capable of being de-coupled, detached, or separated. The collar 130 may be removably coupled to the tool 110 in a variety of ways. For example, the collar 130 may be mechanically removably coupled to the tool 110 with one or more screws, bolts, straps, or combinations thereof. The collar 130 may also be removably coupled to the tool 110 using adhesives, welding, brazing, or combinations thereof. In at least one embodiment, the collar 130 may be configured to be de-coupled from the tool 110 and re-coupled to the tool 110. In another embodiment, the collar 130 may be configured to be de-coupled from the tool but not re-coupled to the tool 110, i.e., not re-usable. As used herein, de-coupled shall mean detached or separated, and re-coupled shall mean reattached or fastened again.

One example of a collar 130 is an annular bracelet or ring configured to be removably coupled around an outer diameter of a cylindrical tool, such as a drilling tool, as shown in FIGS. 1-3. However, as may be appreciated, the collar 130 may be any shape or size depending on the area of the tool 110 to which it is removably coupled. The collar 130 may be made of plastic, metal, or any other material suitable to carry and protect an RFID reader 135 (described below) when the tool 110 is not in use.

An RFID tag 115 may be coupled to or disposed within the tool 110, and an RFID reader 135 may be coupled to or disposed within the collar 130 and configured to receive a radio-frequency (RF) signal 120 from the RFID tag 115. The RFID tag 115 may include an integrated circuit (not shown) and an antenna 116. The integrated circuit may store an identifier that identifies the particular tool 110. The identifier may be a number, such as a serial number, a word or series of words, an alphanumeric, or combinations thereof. In at least one embodiment, the integrated circuit may also store specification information and/or assembly information. Specification information may include information relating to the tool 110, such as the dimensions, the material composition, the date of manufacture, the name of the manufacturer, the contact information for the manufacturer, the date of rental, the date of shipment, the date of assembly, the date and/or results of a quality inspection, or the like. Assembly information may include instructions for assembling one or more components of the tool 110 or assembling the tool 110 with another tool (not shown).

The antenna 116 of the RFID tag 115 may be configured to receive and transmit the RF signal 120 at a particular frequency. In at least one embodiment, the frequency of the RF signal 120 may range from a low of about 30 kHz to a high of about 3 GHz. For example, the RF signal 120 may be a low frequency signal between about 30 kHz and about 300 kHz, a medium frequency signal between about 300 kHz and about 3 MHz, a high frequency signal between about 3 MHz and about 30 MHz, a very high frequency signal between about 30 MHz and about 300 MHz, or an ultra high frequency signal between about 300 MHz and about 3 GHz. The antenna 116 of the RFID tag 115 may transmit the RF signal 120, which may contain the identifier, the specification information, and/or the assembly information, to the RFID reader 135, as discussed in further detail below.

The RFID tag 115 may be a passive tag, an active tag, or a semi-passive tag. A passive tag does not include a battery. Rather, the passive tag draws power from electromagnetic energy transmitted from the RFID reader 135. The transmission range of a passive tag, (i.e., the maximum distance that the passive tag may be from the RFID reader 135 and still receive and transmit the RF signal 120) depends on many factors, including the RF frequency, the power of the RFID reader 135, interference between the RFID tag 115 and the RFID reader 135, or combinations thereof. The transmission range may cover a short distance. In at least one embodiment, the transmission range of a passive tag may be from about 0 meters, i.e., contacting the RFID reader 135, up to about 7 meters or more. For example, the transmission range may be less than about 0.1 meters.

An active tag, on the other hand, includes a battery that allows the tag to broadcast or transmit its RF signal 120 without drawing power from the RFID reader 135. An active tag may transmit its RF signal 120 up to about 100 meters in some embodiments, but may be able to transmit the RF signal 120 greater distances in other embodiments. A semi-passive tag includes a battery to run the integrated circuit but receives and transmits the RF signal 120 by drawing power from the RFID reader 135.

In at least one embodiment, the RFID tag 115 may be embedded in the tool 110. This is possible because a direct line of sight between the RFID tag 115 and the RFID reader 135 is not required to transmit the RF signal 120. In another embodiment, the RFID tag 115 may be mounted or affixed to an outer surface of the tool 110. For example, the RFID tag 115 may be mounted to and flush with the outer surface of the tool 110. The RFID tag 115 may be mechanically fastened to the tool 110 using one or more screws, bolts, straps, or combinations thereof. In other embodiments, the RFID tag 115 may be fastened to the tool 110 using adhesives, welding, brazing, or combinations thereof.

The RFID reader (also known as an interrogator) 135 may be coupled to or disposed within the collar 130. In at least one embodiment, the general disposition of the RFID tag 115 and the RFID reader 135 may be reversed, such that the RFID reader 135 is coupled to or disposed within the tool 110, and the RFID tag 115 is coupled to or disposed within the collar 130 (not shown). The RFID reader 135 will generally be within transmission range of the RFID tag 115 and receive the RF signal 120 from the RFID tag 115 when the collar 130 is removably coupled to the tool 110. When the RFID reader 135 receives the RF signal 120 from the RFID tag 115, the RFID reader 135 may convert the RF signal 120 into digital information. The digital information may include the identifier, the specification information, and/or the assembly information.

In at least one embodiment, the RFID reader 135 may be embedded within the collar 130. In another embodiment, the RFID reader 135 may be coupled to and/or flush with an inner surface of the collar 130 (not shown). The RFID reader 135 may be coupled to or disposed within the collar 130 with one or more screws, one or more bolts, one or more straps, an interference or friction fit, adhesive, or the like. In at least one embodiment, the RFID tag 115 is covered by the collar 130 when the collar 130 is removably coupled to the tool 110, as shown in FIG. 1. For example, the RFID tag 115 and the RFID reader 135 may be aligned when the collar 130 is removably coupled to the tool 110 to enhance the strength of the RF signal 120 transmitted from the RFID tag 115 to the RFID reader 135. In another embodiment, the RFID tag 115 may not be covered by the collar 130 when the collar 130 is removably coupled to the tool 110 (not shown).

A communication device 140 may also be coupled to the collar 130. The communication device 140 may be coupled to the collar 130 in the same manner as the RFID reader 135, e.g., embedded, mechanically attached, interference fit, adhesive, or it may be coupled to the collar 130 in any other manner known to those skilled in the art. In at least one embodiment, the communication device 140 may be integrated with the RFID reader 135 to form a single component.

The communication device 140 may be configured to receive an alert signal 145 from the RFID reader 135 when the collar 130 is de-coupled from the tool 110. After receiving the alert signal 145, the communication device 140 may be configured to transmit a direct distributor signal 150 and/or a monitor signal 155, as described in further detail below. The signals 145, 150, 155 may be transmitted wirelessly or through a hard line connection.

In at least one embodiment, a monitor 160 may be in communication with the communication device 140. The monitor 160 may include a storage device 161 configured to store information such as the identity of the particular tool 110, the time the collar 130 was de-coupled from the tool 110, the time the collar 130 was re-coupled with the tool 110, or the like. In at least one embodiment, the monitor 160 may be configured to transmit a first indirect distributor signal 165 to the distributor indicative of the time the collar 130 was de-coupled from the tool 110. The monitor 160 may be on site with the tool 110, in an office of the distributor, or another suitable location. In at least one embodiment, the monitor 160 may be coupled to or part of the collar 130.

In operation, a user may rent or lease the tool 110 from a distributor, and the rental agreement may provide that payments for the tool 110 are based upon the amount of time or the number of times the tool 110 is used, run, or otherwise operated. Thus, although the user may have possession of the tool 110, the user may not be charged a rental, lease, or even a purchase fee for the tool 110 until the tool 110 is put into use. Before the tool 110 is used, the collar 130 may be removably coupled to the tool 110 such that the RFID reader 135 is located within transmission range of the RFID tag 115 and may receive the RF signal 120 from the RFID tag 115, as shown in FIG. 1. The RF signal 120 may be transmitted continuously, at predetermined time intervals, or as requested by the distributor.

The renting user may remove or de-couple the collar 130 from the tool 110 prior to using the tool 110, as shown in FIG. 2. In at least one embodiment, the tool 110 may not function properly (or at all) when the collar 130 is coupled thereto. In another embodiment, the tool 110 may not be able to be assembled when the collar 130 is coupled thereto. In yet another embodiment, the tool 110 may not fit into its downhole position when the collar 130 is coupled thereto. Consequently, the collar 130 may be de-coupled from the tool 110 in order to operate or otherwise use the tool 110.

When the collar 130 is de-coupled from the tool 110, the RFID reader 135 may no longer receive the RF signal 120 from the RFID tag 115. In at least one embodiment, the RFID tag 115 and/or the RFID reader 135 may have a limited transmission range such that the RFID reader 135 will not receive the RF signal 120 when the collar 130 is de-coupled from the tool 110. For example, the transmission range may be less than about five meters, less than about one meter, less than about 0.5 meters, or less than about 0.1 meters. In another embodiment, the content of the RF signal 120 may change when the collar 130 is de-coupled from the tool 110. In yet other embodiments, the de-coupling of the collar 130 from the tool 110 may be detected by any method known in the art, such as mechanical switches or contacts, an electrical connection, or the like.

When the RFID reader 135 does not receive the RF signal 120 for a predetermined amount of time (or when the signal content changes), the RFID reader 135 may be configured to trigger a first alert indicating that the collar 130 has been de-coupled from the tool 110. The predetermined amount of time leading up to the first alert may vary depending on the purpose of the tool 110, the agreement between the renting user and the distributor, or other factors that may be encountered in differing situations. The predetermined amount of time may also serve to prevent false alerts in the event that one or more RF signals 120 are not received by the RFID reader 135 despite the fact that the collar 130 remains coupled to the tool 110. In at least one embodiment, the predetermined amount of time leading up to the first alert may be less than about thirty minutes, less than about an hour, less than about three hours, less than about six hours, less than about twelve hours, or less than about twenty four hours.

The first alert signifies that the tool 110 is de-coupled from the collar 130, and under terms generally set forth in the associated rental or license agreement for the tool 110, the tool 110 will now be characterized as "in use." The RFID reader 135 may trigger the first alert by transmitting a first alert signal 145 to the communication device 140 (see FIG. 2). In at least one embodiment, the communication device 140 may then transmit a first direct distributor signal 150 to the distributor, and the distributor may record (the time) that the collar 130 was de-coupled and that the tool 110 is "in use." In another embodiment, the communication device 140 may transmit a first monitor signal 155 to the monitor 160. The monitor 160 may record (the time) that the collar 130 was de-coupled and/or transmit a first indirect distributor signal 165 to the distributor so that the distributor may record (the time) that the collar 130 was de-coupled and that the tool 110 is "in use." In at least one embodiment, the communication device 140 and/or the monitor 160 may be configured to transmit the signals 150,165 over a long distance to the distributor through various conventional signal transmission techniques. For example, the signals 150,165 may be transmitted more than 100 kilometers, more than 1,000 kilometers, or more than 10,000 kilometers via copper wire, fiber optic line, wireless transmission, or the like.

In at least one embodiment, when the renting user is finished using the tool 110, the collar 130 may be re-coupled to the tool 110 (see FIG. 3) such that the RFID reader 135 is once again located within transmission range of the RFID tag 115 and may successfully receive the RF signal 120 from the RFID tag 115. At this point, the RFID reader 135 may trigger a second alert indicating that the collar 130 has been re-coupled to the tool 110. This signifies that the tool 110 is no longer characterized as "in use."

The RFID reader 135 may trigger the second alert by transmitting a second alert signal 345 to the communication device 140. In at least one embodiment, the communication device 140 may transmit a second direct distributor signal 350 to the distributor, and the distributor may record (the time) that the collar 130 was re-coupled to the tool 110. In another embodiment, the communication device 140 may transmit a second monitor signal 355 to the monitor 160. The monitor 160 may record (the time) that the collar 130 was re-coupled to the tool 110 and/or transmit a second indirect distributor signal 365 to the distributor so that the distributor may record (the time) that the collar 130 was re-coupled to the tool 110. In at least one embodiment, the collar 130 may not be re-coupled to the tool 110 after the tool 110 is used, and no second alert occurs. In at least one embodiment, the de-coupling and re-coupling occurrences may be recorded using a computer readable medium and/or software. The distributor and/or renting user may be notified each time a de-coupling or re-coupling occurs. Further, the distributor and/or renting user may be able to access the history of each de-coupling and re-coupling occurrence during the current rental period or previous rental periods.

After receiving the signal(s) 150,165,350,365 from the communication device 140 and/or the monitor 160, the distributor may calculate the time that the tool 110 was in use, if desired, by comparing the time the collar 130 was de-coupled from the tool 110 and the time the collar 130 was re-coupled to the tool 110. In at least one embodiment, the tool 110 may be used multiple times during a single rental. In this case, the collar 130 may be de-coupled before each use and re-coupled with the tool 110 again after each use creating multiple de-coupling and re-coupling times. For each period that the tool 110 was in use, the time may be aggregated to determine the total time that the tool 110 was in use while the tool 110 was rented. Furthermore, if required, the number of times that the tool 110 was used during the rental period may be determined by examining the number of times the collar 130 was de-coupled from and re-coupled to the tool 110. Based upon this information, the distributor may compile an accurate accounting of the amount of time and/or the number of times the tool 110 was in use.

In at least one embodiment, the collar 130 may not be re-coupled to the tool 110 after the tool 110 has been used. As such, only a single alert may be triggered by the RFID reader 135 corresponding to time the collar 130 was de-coupled from the tool 110. In these embodiments the associated license or rental agreement will generally calculate the fee by comparing the time the collar 130 was de-coupled from the tool 110 and the time the tool 110 was returned to the distributor, regardless of the aggregate time the tool 110 was actually in use or the number of times the tool 110 was used.

In at least one embodiment, the tool 110 may be used while the collar 130 is still coupled thereto. When this occurs, the distributor may still track the usage of the tool 110. For example, the RFID reader 135 and/or the communication device 140 may be directly or indirectly in communication with the tool 110 and configured to detect when the tool 110 is in use. When use of the tool 110 is initiated, communication with the monitor 160 and/or the distributor may occur as described above. Depending on the location of the tool 110 while in use, i.e., downhole, the first alert signal 145 may not be received from the communication device 140 due to interference by the surrounding earth. In at least one embodiment, the communication device 140 may transmit signals to the monitor 160 and/or the distributor continuously or at predetermined time intervals (not shown). As such, when the signals are not received by the monitor 160 and/or the distributor for a predetermined amount of time, such as when the tool 110 is downhole, the tool 110 may be characterized as "in use."

In at least one embodiment, the RFID tag 115 may include a microprocessor and memory such that the RFID tag 115 is able to collect, process, and store data relating to the use of the tool 110. The RFID tag 115 may be an active tag having a battery that powers the microprocessor and the memory. The RFID tag 115 may receive the data from a sensor (not shown) that is coupled to or integrated with the RFID tag 115. The data may include, but is not limited to, the temperature of the tool 110 and/or the downhole environment, the time the tool 110 is in use, the depth of the tool 110, the speed at which the tool 110 is operated, e.g., RPM, and the magnitude of the vibration of the tool 110. This data may be retrieved from the RFID tag 115 by the RFID reader 135 and/or the distributor when the tool 110 is returned.

Figure 4:
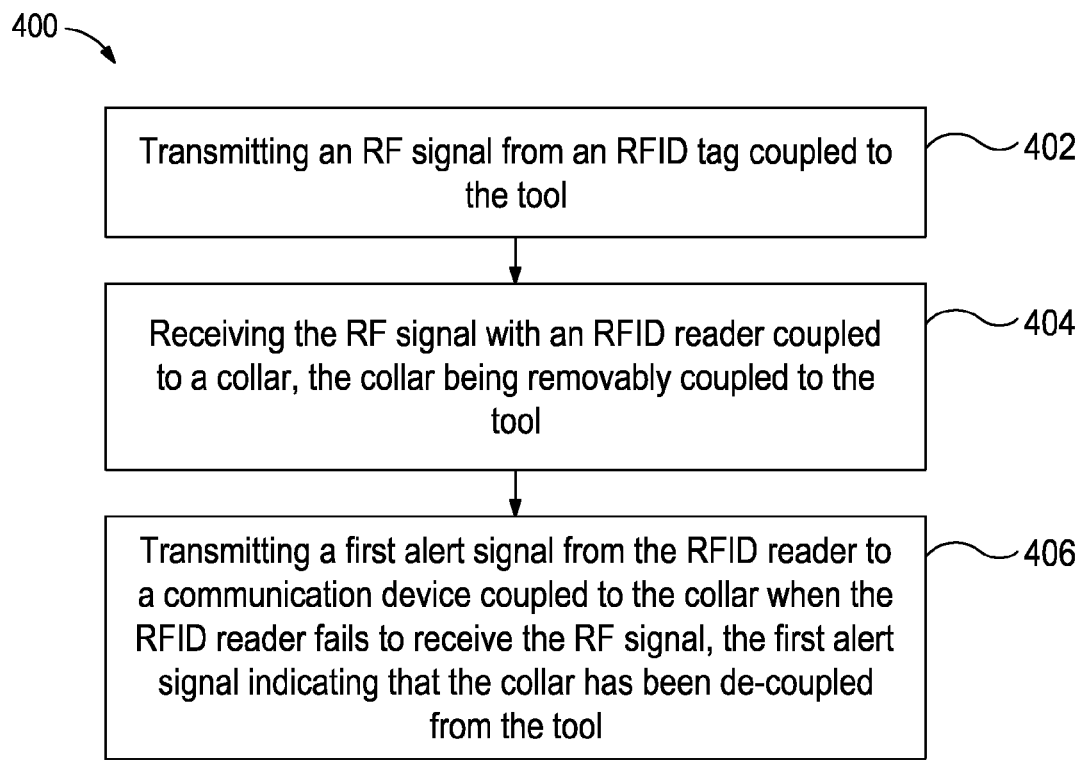
FIG. 4 illustrates an exemplary method of monitoring the use of the tool.

FIG. 4 illustrates an exemplary method 400 of monitoring the use of a tool. The method 400 may include transmitting an RF signal from an RFID tag coupled to the tool, as shown at 402. The method 400 may also include receiving the RF signal with an RFID reader coupled to a collar, the collar being removably coupled to the tool, as shown at 404. The method 400 may further include transmitting a first alert signal from the RFID reader to a communication device coupled to the collar when the RFID reader fails to receive the RF signal, the first alert signal indicating that the collar has been de-coupled from the tool, as shown at 406.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:
1. A method for monitoring use of a tool, comprising:
  transmitting an RF signal from an active RFID tag coupled to the tool, the active RFID tag comprising:
    a microprocessor configured to collect and process data relating to the use of the tool;

memory configured to store the data relating to the use of the tool; and a battery configured to power the microprocessor and the memory;

receiving the RF signal with an RFID reader coupled to a collar, the collar being removably coupled to the tool;

transmitting a first alert signal from the RFID reader to a communication device coupled to the collar when the RFID reader fails to receive the RF signal, the first alert signal indicating that the collar has been de-coupled from the tool;

transmitting the data relating to the use of the tool to the active RFID tag via a sensor coupled to or integral with the active RFID tag;

transmitting a monitor signal from the communication device to a monitor; and transmitting an indirect distributor signal from the monitor to a distributor of the tool, the indirect distributor signal indicative of the time the collar was de-coupled from the tool.

2. The method of claim 1, further comprising transmitting a direct distributor signal from the communication device to a distributor of the tool.

3. The method of claim 1, further comprising transmitting a second alert signal from the RFID reader when the RFID reader receives the RF signal anew, the second alert signal indicating that the collar has been re-coupled to the tool.

4. The method of claim 3, further comprising calculating an amount of time the tool is in use by comparing time between the first and second alert signals.

5. The method of claim 3, further comprising calculating a number of times the tool is used by examining a number of first and second alert signals.

* * * * *